F. POTTER.
TRACTOR PLOW.
APPLICATION FILED JUNE 6, 1917.
1,321,551.
Patented Nov. 11, 1919.
2 SHEETS—SHEET 1.
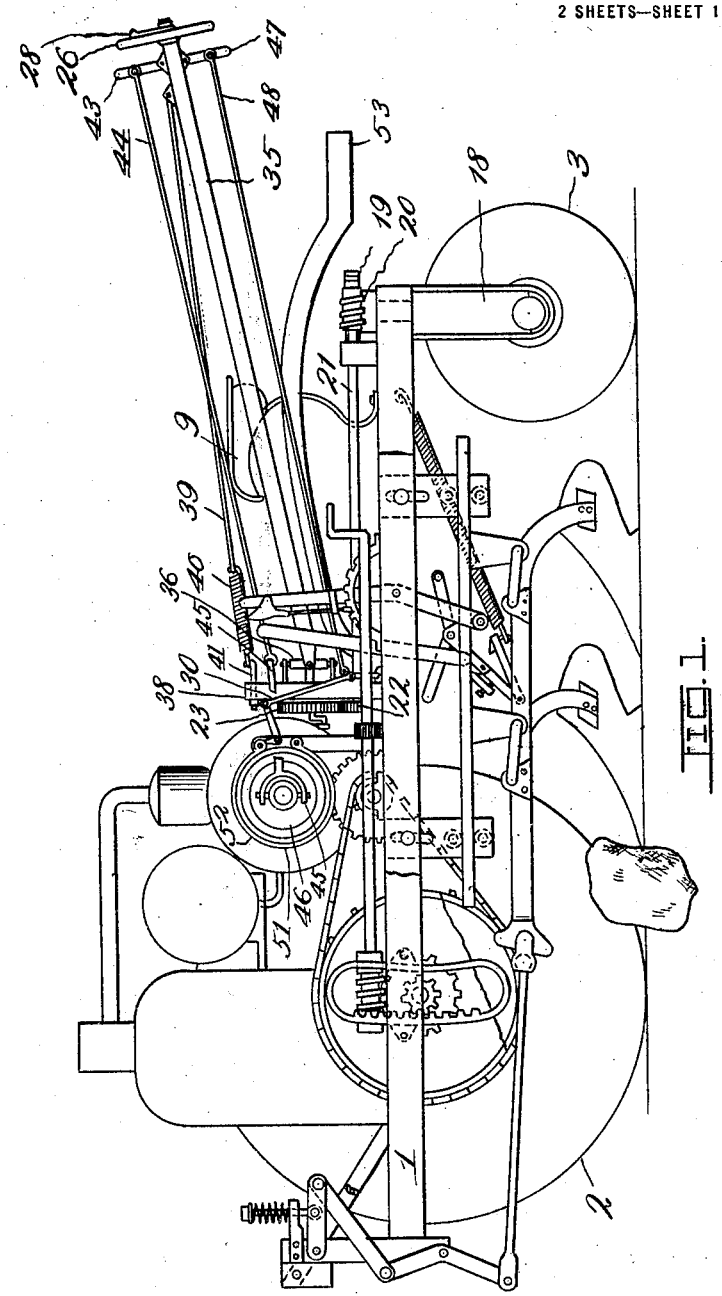
WITNESS:
L. J. Fischer
INVENTOR.
Frank Potter,
BY
F. G. Fischer,
ATTORNEY.

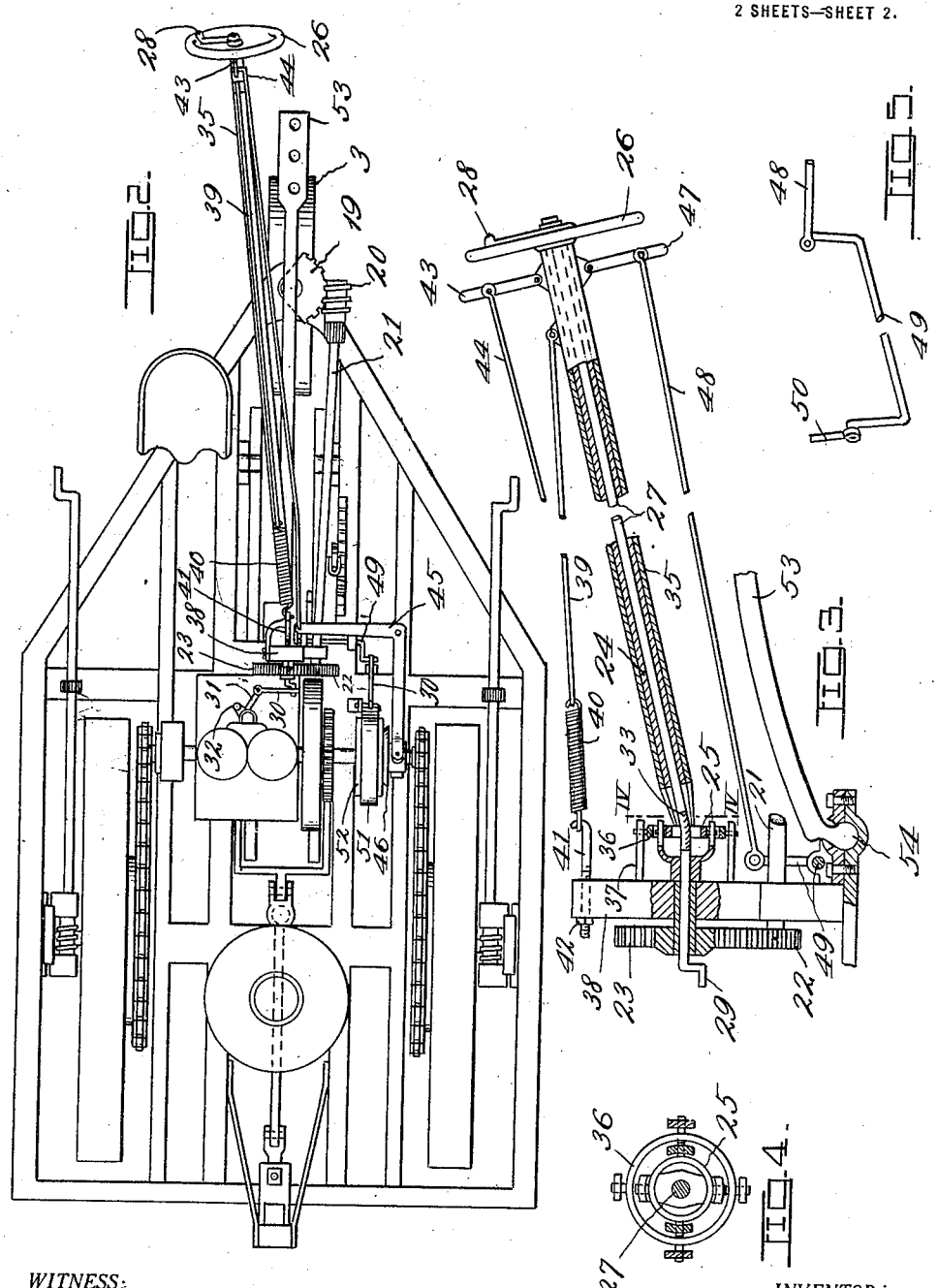

UNITED STATES PATENT OFFICE.

FRANK POTTER, OF CARTHAGE, MISSOURI.

TRACTOR-PLOW.

1,321,551.   Specification of Letters Patent.   Patented Nov. 11, 1919.

Application filed June 6, 1917.   Serial No. 173,216.

*To all whom it may concern:*

Be it known that I, FRANK POTTER, a citizen of the United States, residing at Carthage, in the county of Jasper and State of Missouri, have invented certain new and useful Improvements in Tractor-Plows, of which the following is a specification.

My invention relates to improvements in tractor plows, and my object is the provision of an extension steering mechanism and motor controlling means, whereby my machine can be conveniently controlled by an operator from the seat of a binder or other machine hitched to my machine, to the end that both machines can be controlled by one person.

In order that the invention may be fully understood, reference will now be made to the accompanying drawings, in which:

Figure 1 is a side elevation of a machine constructed in accordance with my invention and with the near drive wheel omitted.

Fig. 2 is a plan view of the machine with some of the parts omitted.

Fig. 3 is a broken vertical longitudinal section of the draw-bar, the extension steering means, and the extension motor controlling means, constituting important features of the invention.

Fig. 4 is a cross section on line IV—IV of Fig. 3, disclosing two universal connections employed in carrying out the invention.

Fig. 5 is a detail perspective of a crank shaft and connecting parts, constituting part of a brake mechanism employed in carrying out the invention.

In carrying out the invention, I employ a suitable frame 1, mounted upon a pair of drive wheels 2 and a steering wheel 3.

The steering wheel 3 is mounted in a vertical member 18, pivoted at its upper end to the rear portion of the frame 1 and provided with a fixedly-mounted segmental gear 19, intermeshing with a worm 20, fixed upon a shaft 21 provided at its forward end with a pinion 22, intermeshing with a cog wheel 23, fixed upon the forward end of a tubular extension shaft 24, having an intermediate universal connection 25 and provided at its rear end with a steering wheel 26, whereby the steering wheel 3, through the intermediacy of the aforementioned parts can be readily controlled.

The tubular shaft 24 embraces a shaft 27, provided at its rear end with a throttle lever 28 and at its forward end with a crank 29 connected by a link 30 to a throttle valve 31 of the motor carbureter 32, for the purpose of regulating the speed of the motor. As disclosed by Fig. 3, the forward lower portion of the shaft 27 is provided with a flexible joint 33, extending through the universal coupling 25 to allow said shaft 27 to adjust itself with the tubular shaft 24.

The shaft 24 is mounted in a tube 35 connected at its lower end by a universal coupling 36 to a pair of arms 37, fixed to a standard 38 projecting upwardly from the frame 1 and constituting a bearing for the lower portion of the shaft 24. The rear free end of the tube 35 is flexibly-supported by a rod 39, a coil spring 40, and a hook 41, which latter extends through the upper portion of the standard 38 and is provided with a nut 42, whereby it may be adjusted to tension the spring 40 and hold the tube 35 at approximately the desired inclination.

43 designates a clutch lever fulcrumed upon the upper rear portion of the tube 35 and pivotally-secured to a connecting rod 44, extending forwardly to a bell-crank 45, for controlling a clutch 46, whereby the machine may be stopped or started. Said clutch 46 is thrown out of gear when other machinery such as pumps, corn shellers, churns, etc., is to be driven from the pulley 17.

47 designates a brake lever fulcrumed upon the rear portion of the tube 35 and pivotally-connected to a rod 48, flexibly connected at its lower forward portion to a rock-shaft 49, pivotally-connected to a link 50, operably-connected at its upper end to a brake band mechanism 51, embracing a brake wheel 52, fixed upon the motor shaft 15.

The tube 35 and associated parts extend backwardly beyond the rear end of the machine, as disclosed by Figs. 1 and 2, so that the steering wheel 26 may be grasped by the operator when sitting upon the seat of a disk cultivator, manure spreader, or other apparatus hitched to my machine through the intermediacy of a drawbar 53, connected at its forward end to the frame 1 by a universal joint 54, arranged in vertical alinement with the universal joints 25 and 36, as disclosed by Fig. 4. When the drawbar 53, which is arched to clear the rear portion of the frame 1, and the extension steering mechanism are used, the seat 9 is, preferably, removed so as not to interfere with the movements of said parts, but when my machine is to be used alone the drawbar 53 is removed and a short steering mechanism reaching to within convenient reach of the seat 9 is employed.

From the foregoing description, it is apparent that I have produced a machine embodying the features of advantage above enumerated, and while I have shown and described the preferred form of my invention, I reserve the right to make such changes in the construction, combination and arrangement of parts as properly fall within the spirit and scope of the claim.

Having thus described my invention, what I claim and desire to secure by Letters Patent, is:

In combination with a tractor, an extension tube, a universal joint connecting said tube to the tractor frame, an extension shaft journaled in said tube, a steering wheel fixed to one end of said extension shaft, a gear wheel fixed to the opposite end of said extension shaft, a universal joint in said extension shaft adjacent the first universal joint, a guide wheel for the tractor, and gearing between the above-mentioned gear wheel and said guide wheel whereby the latter may be controlled by the steering wheel.

In testimony whereof I affix my signature, in the presence of two witnesses.

FRANK POTTER.

Witnesses:
S. A. KELTNER,
H. H. BAILY.

Copies of this patent may be obtained for five cents each, by addressing the "Commissioner of Patents, Washington, D. C."